US00RE35032E

United States Patent [19]

Rahamin et al.

[11] E Patent Number: Re. 35,032

[45] Reissued Date of Patent: Sep. 5, 1995

[54] ELECTRONIC REMINDER SYSTEM

[76] Inventors: Raphael Rahamin, 2717 N. Vista Ct., Orange, Calif. 92887; Gabriel Cabelli, 30 Hacarmel Street, Hod Hasharon, Israel

[21] Appl. No.: 292,909

[22] Filed: Aug. 19, 1994

Related U.S. Patent Documents

Reissue of:

[64] Patent No.: 4,228,470
Issued: Oct. 14, 1980
Appl. No.: 954,987
Filed: Oct. 26, 1978

[30] Foreign Application Priority Data

Jan. 4, 1978 [IL] Israel ..... 53745

[51] Int. Cl.[6] ..... G11B 5/00

[52] U.S. Cl. ..... 360/12; 360/4; 360/72.2

[58] Field of Search ..... 360/12, 4, 72.2

[56] References Cited

U.S. PATENT DOCUMENTS 3,647,991 3/1972 Gaon et al. ..... 179/100.1 C
3,919,834 11/1975 Murakami et al. ..... 179/100.1 C
3,996,671 12/1976 Foster ..... 360/72.2
4,070,697 1/1978 Miller et al. ..... 360/12
4,097,905 6/1978 Krammer ..... 360/12
4,101,742 7/1978 Craig et al. ..... 360/12
4,302,752 11/1981 Weitzler ..... 340/309.1

*Primary Examiner*—Vincent Canney
*Attorney, Agent, or Firm*—Benjamin J. Borish

[57] ABSTRACT

An electronic reminder system is described for recording a plurality of different spoken messages on a record medium, which messages are to be played-back at a specific point-of-time for each message. The system comprises a microphone for recording the spoken messages, a keyboard for inputting data representing the specified point-of-time at which the respective spoken message is to be played-back, a real-time clock for measuring time in a real-time manner and for producing an output corresponding to such real-time measurement, control means controlled by the clock for signaling automatically the arrival of each specified point-of-time at which a recorded spoken message is to be played back, and a speaker for effecting the play-back of the spoken message.

14 Claims, 3 Drawing Sheets

ELECTRONIC REMINDER SYSTEM

Matter enclosed in heavy brackets [ ] appears in the original patent but forms no part of this reissue specification; matter printed in italics indicates the additions made by reissue.

BACKGROUND OF THE INVENTION

The present invention relates to an electronic reminder system, and more particularly, to a system which automatically provides the user with prerecorded spoken message reminders at preselected times.

It is usually necessary for a person to keep track of a large number of different activities that he is to perform at different preselected times. Not only does this require considerable mental effort in keeping track of these activities, but there is also the danger of missing a specified time or of making an error in the specific activity to be performed at the specified time. Many memory aids have been devised for this purpose, but generally these aids are improvised and are not entirely satisfactory for all situations.

An object of the present invention is to provide an electronic reminder system which relieves the user of the mental effort required, and the possibility of error, in keeping track of the many different activities that the user is to perform at different preselected times.

SUMMARY OF THE INVENTION

According to a broad aspect of the present invention, there is provided an electronic reminder system, comprising: means for receiving a record medium on which a plurality of different spoken messages are each to be recorded and to be played-back at a specified day, hour and minute point-of-time for each message; a microphone for recording the spoken messages; manual time selector means, such as a keyboard for inputting the specified day, hour and minute point-of-time at which the respective spoken message is to be played-back; a real-time clock for measuring time in a real-time manner and for producing an output corresponding to such real-time measurement; control means controlled by the output of said clock for signalling automatically the arrival of each specified point-of-time at which a recorded spoken message is to be played-back; and play-back means including a speaker for effecting the play-back of such spoken message.

In the preferred embodiment of the invention described below, the keyboard comprises a plurality of depressible keys for inputting the specified point-of-time; an "In" key effective, when depressed, to enable the recording medium to record a spoken message at a section thereof identified by the inputted point-of-time; and an "Out" key effective, when depressed, to enable the record medium to play-back a spoken message from a section thereof identified by the inputted point-of-time data.

The preferred embodiment of the invention described below further includes a "Play" key for effecting the play-back of the respective recorded message after its specified point-of-time has arrived.

Actually, in the described preferred embodiment, there is included a selector switch presettable to an Automatic Mode for automatically signalling the arrival of each specified point-of-time at which a recorded message is to be played back, and for automatically effecting the play-back of the respective recorded message upon the arrival of its specified point-of-time; or to a Manual Mode for automatically signalling the arrival of each such specified point-of-time and for enabling the play-back of the respective recorded message; said system further including a "Play" key which, when depressed while the selector switch is preset in the Manual Mode, effects the play-back of the respective recorded message after its specified point-of-time has arrived.

Further included in the described preferred embodiment is a display unit for displaying the real-time as measured by the clock, the control means including means effective, upon the inputting of a specified point-of-time, to display said latter time instead of the real-time measurement.

In the preferred described embodiment, the record medium includes a message track divided into a plurality of addressable recording sections each for magnetically recording one of said messages.

According to further features in the described preferred embodiment, the control means comprises a memory having a storage location for each of said addressable recording sections of the message track; means for storing each inputted point-of-time in the storage location of the memory corresponding to the addressable recording section in which the respective message is to be recorded; comparing means for periodically comparing the output of the real-time clock with the specified point-of-time stored in said memory for determining the arrival of each specified point-of-time at which a recorded message is to be played-back; a signalling device actuated by said comparing means for signalling the arrival of a specified point-of-time at which a recorded message is to be played-back; and drive means for driving the record medium to the addressable recording section on which is recorded the message corresponding to the arrived specified point-of-time.

Further features and advantages of the invention will be described below:

BRIEF DESCRIPTION OF THE DRAWINGS

The invention is described below, for purposes of example, with respect to the accompanying drawings, wherein.

GENERALIZED FORM OF PREFERRED EMBODIMENT

Figure 1:
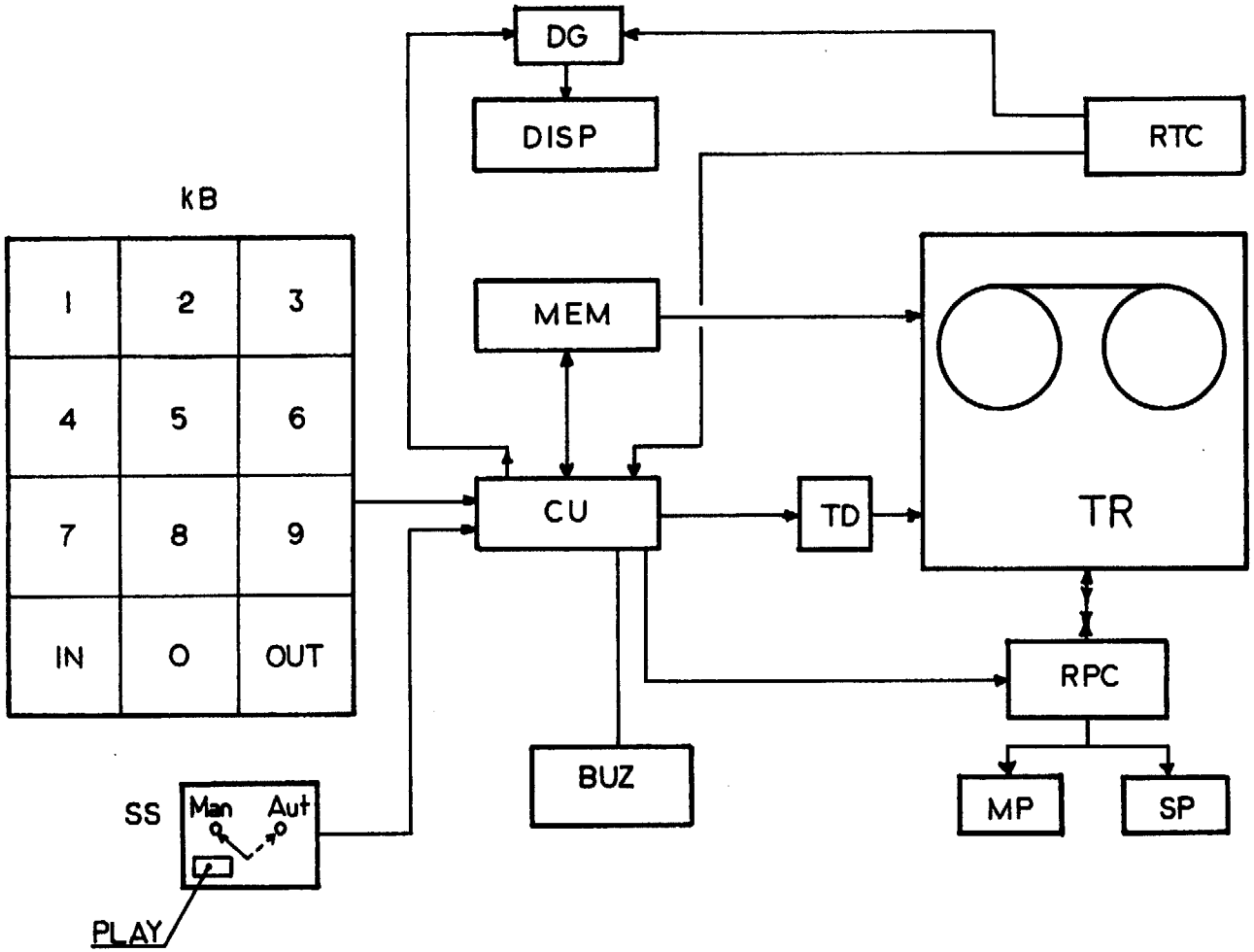
FIG. 1 is a block diagram illustrating in generalized form a preferred embodiment of electronic reminder system constructed in accordance with the invention.

With reference first to the generalized form of the system illustrated in FIG. 1, it will be seen that the system includes a tape recorder unit TR driven by a tape drive TD controlled by a control unit CU. The control unit CU is in turn controlled by a keyboard KB, a real-time clock RTC, and a selector switch SS. The control unit CU, in addition to controlling the tape drive TD, also controls a record/play-back circuit RPC, a time display circuit DISP, and a signalling circuit in the form of a buzzer BUZ. Messages can be recorded in the tape recorder via a microphone MP, and played-back therefrom via a speaker SP each message being selectively enabled by the record/play-back circuit RPC.

The system further includes a memory MEM which may be external to the control unit CU as shown; alternatively, it may be part of the control unit particularly when the control unit is implemented on one or more integrated circuit chips.

Briefly, the system illustrated in FIG. 1 operates as follows: The keyboard KB constitutes a manual time selector and includes ten depressible numerical keys (0–9) NK. It further includes an "In" key IK, an "Out" key OK. The operator first inputs a specified point-of-time (day, hour, minute) by depressing the appropriate numerical keys NK to identify a specified day, hour and minute; and then depresses either the "In" key IK, or the "Out" key OK.

If the "In" key IK is depressed, the inputted specified point-of-time will be stored within the memory MEM: In addition, a predetermined time interval (e.g., 20 seconds) will be provided for the user to record a spoken message in the tape recorder TR by the use of the microphone MP, which message is to be played-back at the inputted specified point-of-time. Clock RTC measures the time in a real-time manner, and when the specified point-of-time arrives, the clock causes the control unit CU to actuate the signalling buzzer BUZ, and also to advance the tape drive TD to the play-back position for the recording section of the tape corresponding to the specified point-of-time.

On the other hand, if the "Out" key OK on the keyboard KB had been depressed after inputting the specified point-of-time data by means of the numerical keys NK, the data inputted by the numerical keys, rather than the output of the real-time clock RTC, will be used to control the tape drive TD and the signalling buzzer BUZ via the control unit CU, for playing-back the previously-recorded message corresponding to the point-of-time specified by the user when depressing the numerical keys.

The selector switch SS is used for presetting the system for either one of two modes of operation, namely a Manual Mode or an Automatic Mode. If the system is preset for Automatic Mode, when the stored point-of-time has arrived as determined by the clock RTC, signal buzzer BUZ will be actuated for a short interval (e.g., two-seconds), and at the same time the message recorded on the section of the recording tape RT corresponding to the specified point-of-time will be automatically played-back via speaker SP. On the other hand, if the system has been preset for Manual Mode, when the specified point-of-time has arrived buzzer BUZ will be actuated to alert the user, but the message itself will not be played-back until a "Play" key on the selector switch SS is depressed.

The time display unit DISP normally displays the real-time output from the clock RTC. However, as soon as the first of the numerical (0–9) keys is depressed on the keyboard KB, the point-of-time specified by the depression of the numerical keys on the keyboard is displayed instead.

Figure 2:
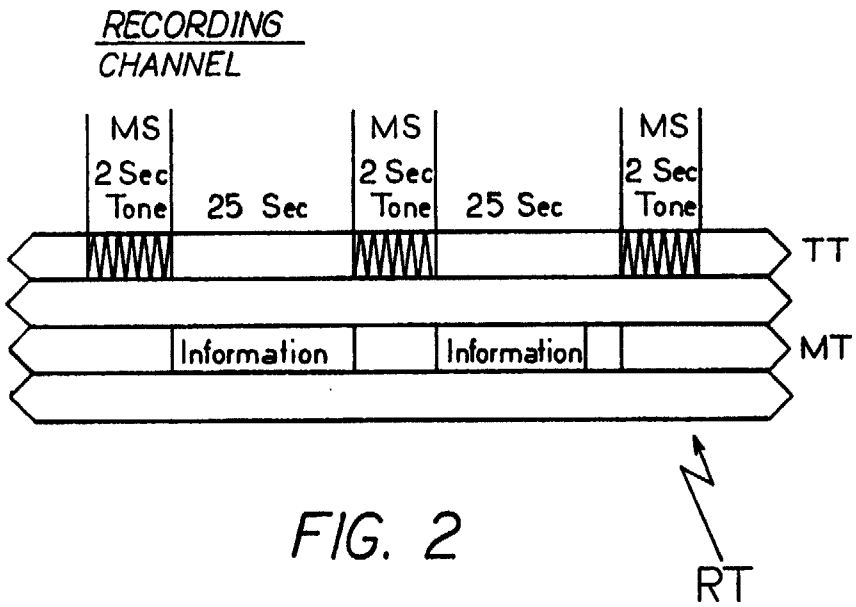
FIG. 2 is a section of a magnetic recording tape used in the system of FIG. 1.

The tape recorder TR may be of a conventional cassette type magnetic tape recording unit. In this case, however, the recording tape RT, shown in FIG. 2, includes two tracks, namely a message track MT divided into a plurality of addressable recording sections each for magnetically recording one of the messages, and time track TT for recording a mark signal MS at the beginning of the respective message track MT. As one example, the mark signal MS may be a two-second tone signal, and each recording section of the message track MT may provide an interval of 25 seconds for recording the respective message. In the system to be described below, there are 64 addressable recording sections on the message track MT, thereby enabling the system to accommodate up to 64 messages to be played-back at 64 different points-of-time. A conventional tape cassette providing a recording time of 30 minuts (1,800 seconds) on each side (only one side being used) would be more than adequate to accommodate the 64 different addressable recording sections requiring 1,600 seconds total recording time.

Figure 3:
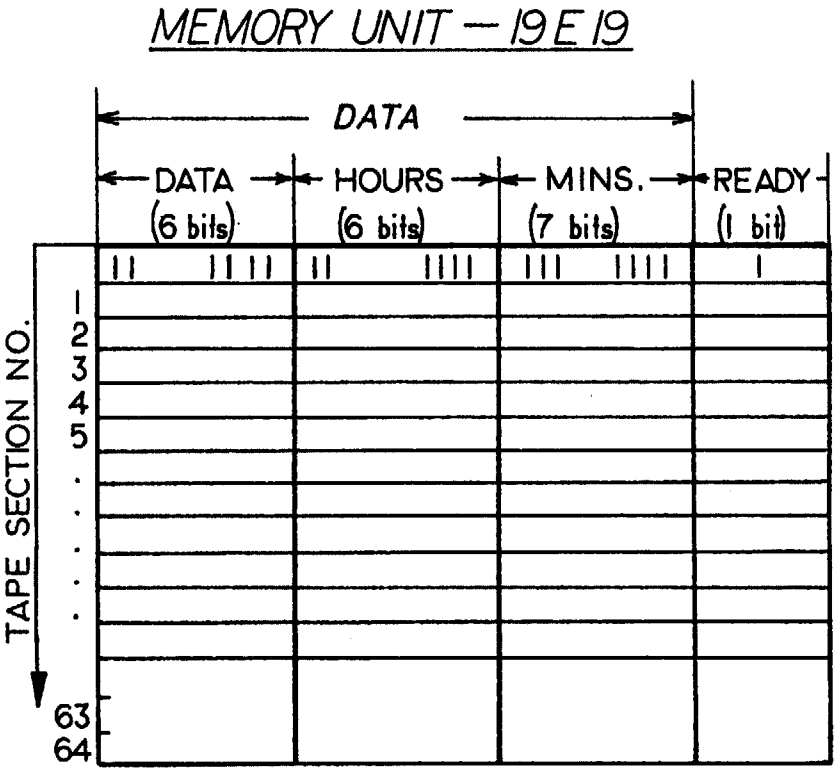
FIG. 3 schematically illustrates the memory unit used in the system of FIG. 1, particularly the plurality of its storage locations and the point-of-time data adapted to be stored in each.

The memory unit MEM for storing the points-of-time at which the different messages are to be played-back, is illustrated in FIG. 3 and will be described more particularly below.

DETAILED DESCRIPTION OF THE ILLUSTRATED PREFERRED EMBODIMENT

Figure 4:
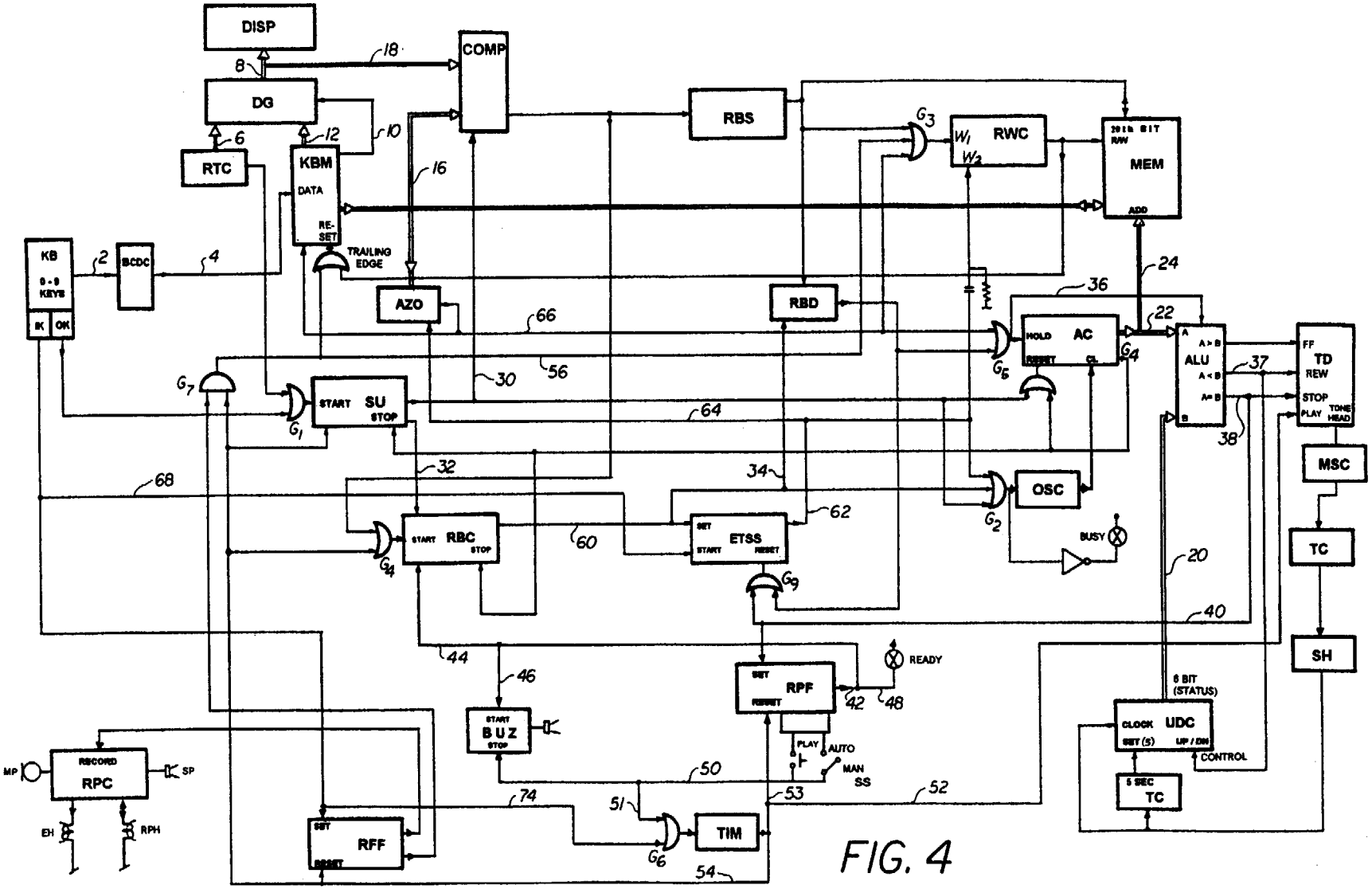
FIG. 4 is a more detailed block diagram illustrating particularly the control unit in the system of FIG. 1.

Reference is now made to the FIG. 4 block diagram for a more detailed illustration of the electronic reminder system of FIG. 1.

The control unit, generally designated CU in FIG. 1, includes a converter unit BCDC for converting to binary-coded-decimal (BCD), the data inputted via line 2 by depressing the keyboard numerical keys NK. This information is fed via line 4 into a keyboard memory unit KBM.

The real-time clock RTC is a crystal-controlled digital clock which measures time in a real-time manner. Its output is fed via line 6 to a display gating unit DG and from there via line 8 to the time display unit DISP, so that the latter normally displays the real time as measured by clock RTC. As indicated earlier, however, as soon as the first of the keyboard numerical keys NK is depressed, the display unit DISP, instead of displaying the real-time, displays the time as inputted into the keyboard KB by the depression of the numerical keys. This transfer of the inputted time to the display unit DISP is effected via control line 10 from the keyboard memory unit KBM to the display gating unit DG, the point-of-time information being inputted to the display gating unit DG via data bus 12 from the keyboard memory unit KEM. The latter unit KBM also feeds the inputted point-of-time information to the memory unit MEM via bus 14.

The memory unit MEM, as illustrated in FIG. 3, includes a plurality of storage locations, one for each of the recording sections of the magnetic tape capable of having a message recorded thereon at any specified point-of-time. In the system described, there are 64 such message sections, and therefore memory unit MEM would have 64 storage locations, Each storage location is capable of storing 20 bits of information, to provide 19 bits for specifying a date (6 bits), an hour (6 bits), and a minute (7 bits). This leaves the 20th bit for use as a "Ready" flag, whose function will be described more particularly below. As one example, memory MEM may be a 64×20 bit static random-access memory (RAM). e.g. Motorola MCM 6810 AL.

If desired, a plurality of different messages can be specified for play-back at the same point-of-time, in which case the same specified point-of-time will be recorded at the different memory storage locations for the different messages.

Memory unit is conditioned for operation by a read/-write control unit RWC which is normally reset to cause the memory unit MEM to "read", but when set causes the memory unit to "write".

The control unit CU further includes a comparator unit COMP which receives the information stored in the memory MEM via bus 16 connected to bus 14, and compares this information with the point-of-time data inputted thereto via bus 18. The latter data inputted via bus 18 would normally be the real-time outputted from clock RTC; however as mentioned above, whenever the first one of the numerical keys NK on the keyboard KB is depressed, the display unit DISP receives the keyboard-inputted point-of-time, rather than the real time from clock RTC, and therefore the keyboard inputted data will be inputted via bus 18 into comparator COMP.

The tape drive TD is controlled by an arithmetic logic unit ALU which compares the actual position of the recording tape with a desired position, namely, that of the message section corresponding to a desired point-of-time. The actual position of the tape is continuously monitored by an up-down-counter UDC which feeds this position to unit ALU via bus 20. Counter UDC is in turn controlled by a mark sensor circuit MSC which senses the mark signal MS on the time track TT (FIG. 2) of the recording tape RT, the sensed signal being passed through a tone decoder TC and a shaper circuit SH before being fied to counter UDC. The desired position of the tape is fed to the ALU via a bus 22 from an address counter AC controlled by an oscillator OS, the output of the address counter AC being also fed to the memory unit MEM via bus 24. As will be described more particularly below, the ALU controls the tape drive TD to cause it to advance the magnetic tape to the message section allocated to a point-of-time specified by the address counter AC.

For calibration purposes, the time track TT of the magnetic tape (FIG. 2) may include a five-second tone signal at a predetermined location to designate, for example, the fifth addressable section on the message track MT. For this purpose, the system would include a five-second tone decoder TC (FIG. 4) which sets the up-down counter UDC at address 5 when it senses the five-second calibrating tone signal. Such an arrangement prevents errors when including a new magnetic tape cassette, and also prevents the accumulation of errors during the use of the magnetic tape.

The record/playback unit RPC includes an amplifier for amplifying the spoken message when recorded via the microphone MP or when played-back via the speaker SP. The messages are recorded or played back via a common head RPH, the recorder including a separate erase head EH for erasing the respective section of the message track MT before recording a new message thereon. Unit RPC is conditioned for recording or play-back by a recording flip-flop RFF, which is set for recording and reset for play-back.

As indicated above, the selector switch SS determines the mode of operation of the system. When this switch is preset for "Manual" mode, a ready-for-play flip-flop RPF will be set upon the arrival of a point-of-time which has been specified for playing back a recorded spoken message; this will energize the signal buzzer BUZ, and also a "Ready" light RL, but the message itself will not be played-back until the "Play" button on the selector switch SS is depressed. On the other hand, if the selector switch SS is preset for "Automatic" operation, the setting of the flip-flop RPF will also actuate the buzzer BUZ but will automatically terminate the energization of the buzzer after two seconds, at which time the recorded message for the specified point-of-time will be automatically played back.

The system illustrated in FIG. 4 will be better understood by a description of the following operations:

1. General Scan, involving a search for a specified point-of-time and marking the memory unit MEM therefor by setting the "Ready" bit (the 20th bit for the corresponding section number, FIG. 3), the scanning being controlled by the real-time clock RTC (e.g. once every minute), or by a point-of-time inputted via the keyboard;

2. Ready-Bit Search, involving a scanning of the "Ready" bit (20th bit) of all the storage locations in the memory unit MEM;

3. Empty Tape Section Search, involving a search for an empty tape section in order to input a new specified point-of-time;

4. New Message Input, involving the inputting of a new point-of-time in the memory unit MEM, and the recording of the spoken message in a tape section allocated thereto; and 5. Keyboard-Initiated Message Playback, involving the play-back of a previously-recorded message when its specified point-of-time is inputted on the keyboard and the keyboard "Out" key OK is depressed.

Briefly, the General Scan Operation is controlled by a scan unit SU, the "Ready" bit in the memory unit MEM being set by a ready-bit-set unit RBS; the Ready-Bit Search Operation is controlled by a ready-bit-search unit RBC, the "Ready" bit in the memory unit MEM being decoded by a ready-bit-decoder RBD; and the Empty Tape Section Search Operation is controlled by unit ETSS during which an all-zero-detector AZD is operative to locate a memory MEM storage location having "all zero's", thereby designating an empty storage location in the recording tape.

Following is a more complete description of each of the above operations:

1. General Scan Operation

As indicated above, a General Scan Operation is initiated every minute by the real-time clock RTC or by the keyboard KB. A signal from either of the above two units is applied via OR-gate $G_1$ to set the scan unit SU which thereby initiates the General Scan Operation. The scan unit SU applies a signal via line 30 to the comparator COMP enabling it to compare the data outputted from the memory unit MEM with the data being displayed in the display unit DISP, the memory data being applied to the comparator via buses 14, 16, and the display data being applied via bus 18. As indicated earlier, when the General Scan Operation is initiated by the real-time clock RTC, the data in the display unit DISP (and therefore that fed to the comparator COMP via bus 18) will be the real time; but when the General Scan Operation is initiated by the "Out" button on the keyboard KB, the data in the display unit DISP (and therefore that fed to the comparator COMP via bus 18) will be the data inputted by the keyboard KB. If the "Out" button is depressed when no specified point-of-time has been inputted into the keyboard KB, the information in the display unit DISP (and therefore that fed to the comparator COMP) will be the real-time from clock RTC.

The actuation of the scan unit SU to initiate a General Scan Operation actuates the oscillator OS via OR-gate $G_2$, which causes the address counter AC via bus 24, to scan the memory MEM through the 64 memory locations corresponding to the 64 message sections on the record tape. When the address counter reaches the last storage location "64", it resets itself to "0", and terminates the scanning.

As each storage location is scanned, data is fed out of the memory MEM to the comparator COMP via buses 14, 16, wherein it is compared with that from the display unit DISP fed to the comparator via bus 18. During the General Scan Operation, the read/write control unit RWC is in the "Read" condition.

When the comparator COMP locates a storage location having a stored point-of-time which is the same as that shown on the display unit DISP (i.e., the real-time, or the keyboard-inputted time), the comparator COMP sets the ready-bit flip-flop RBS, which will in turn set the 20th bit to logic "1" in the respective storage location. At the same time, unit RBS will, via OR-gate $G_3$, switch the read/write control unit RWC to the "Write" condition. As indicated above, this 20th bit (called the "Ready" bit) is used as a flag when in the condition of logic "1", to indicate that the respective message section in the magnetic tape is ready for outputting a message.

It will thus be seen that in every General Scan Operation, all the storage locations (64) in the memory unit MEM are scanned, and each one in which the stored point-of-time is the same as that on the display unit DISP will be flagged by setting its 20 ("Read") bit to logic "1".

As soon as the General Scan Operation terminates, the "enable" signal, applied to the comparator COMP by the scan unit SU via line 30, will also terminate thereby disabling the comparator.

2. Ready-Bit Search Operation

The Ready-bit Search Operation is controlled by ready-bit-search unit RBC, which unit in turn is controlled by the comparator COMP via OR-gate $G_4$ when the comparator COMP identifies a specified point-of-time in the memory MEM. However, while the scan unit SU is in its actuated condition, during the above-described General Scan Operation, unit RBS is inhibited by a signal applied from unit SU via line 32, so that the Ready-Bit Search Operation is not actually initiated until the General Scan Operation is terminated.

Unit RBC may also be actuated to initiate a Ready-Bit Search at the end of a playback operation by the ready-for-play unit RPF, also via gate $G_4$, the end of the playback being determined by the expiration of 20 seconds from timer TIM.

The actuation of the ready-bit search unit RBC is effective, via Gate $G_2$, to actuate the oscillator OS causing the address counter AC to scan the 64 addresses (storage locations) in the memory unit MEM, starting from address "0" to which it had been reset at the end of the previously-described General Scan Operation. The Read/Write control unit RWC is at this time in the "Read" condition, as indicated above, causing a read-out of the contents of the memory unit MEM. In addition, the actuation of unit RBC also enables, via line 34 the ready-bit decoder unit RED to decode the 20th ("Ready") bit of the data read out of the memory unit MEM, this "Ready" bit, when set to logic "1" as indicated above, being the flag identifying the message section of the record tape for the point-of-time being searched.

When the ready-bit decoder RBD locates a "Ready" bit flag in one of the memory storage locations, it issues a "hold" command via OR-gate $G_5$ to the address counter AC, to hold same at the memory storage location of the respective flag.

At the same time, the signal from the ready-bit decoder RBD enables, (via Gate $G_5$ and line 36) the arithmetic logic unit ALU, causing it to compare the address in the address counter AC with the one from the up-down-counter UDC. In response to this comparison, unit ALU controls the tape drive TD for either Fast-Forward, Rewind, or Stop. For example, if the address counter AC is held by the signal from the ready-bit decoder RBD at address "23", and the current address (i.e., the current position of the tape message section) as supplied by the up-down-counter UDC is "40", unit ALU will issue a "Rewind" command to the tape drive TD via line 37, to cause same to move the tape from address 40 (the current message section) to address 23 (the addressed message section). Unit ALU functions as long as the address counter AC is in its "hold" condition. When the tape drive TD advances the tape to the message section wherein the address inputted to unit ALU from the address counter AC corresponds to that inputted from the up-down counter UDC, unit ALU outputs a signal via line 38 to the "Stop" terminal of the tape drive TD which terminates the operation of the tape drive.

The output signal from line 38 of unit ALU is applied via line 40 to set flip-flop RPF -o its "Ready" condition. In this condition, it outputs a signal on line 42 to the ready-bit-search unit RBC via line 44; the same time, the signal actuates the buzzer BUZ via line 446, and energizes the Ready light RL via line 48. The signal on line 44 to unit RBC inhibits the Ready-Bit-Search Operation, while the actuation of Buzzer BUZ and the energization of the Ready light RL signal the user there is a message for play-back.

As indicated above, if the selector switch SS is in the "Manual" position, the message will not be played-back until the manual Play key is depressed, when this ocurrs, a signal is fed via line 50 to de-energize buzzer BUZ, and also, via line 51 and OR-gate $G_6$ to the timer TIM which outputs a 20-second-Play command via line 52, to the "Play" terminal of the tape drive TD causing the message to be played back. After the elapse of 20 seconds, the timer resets flip-flop RPF via line 53. In addition, timer TIM applies its 20-second signal via line 54 to inhibit the scan unit SU, thereby inhibiting a General Scan Operation during this 20-second interval of play-back.

At the beginning of the 20-second interval, the signal on line 54 (via AND-gate $G_7$, line 56, and OR-gate $G_3$) sets the Read/Write Control Unit RWC to the Write mode; and in addition, the output from AND-gate $G_7$ is applied via line 58 to OR-gate $G_8$ the trailing edge of which signal resets the keyboard memory unit KBM causing same to read-out its contents via bus 14 to the memory unit MEM. Accordingly, since no data has been inputted via the keyboard KB to unit KBM, all zero's will be recorded in the respective storage location of the memory unit MEM, including the 20th ("ready-flag") bit. Unit RWC has a small inherent delay which resets it to the Read mode shortly after the trailing edge of the 20-second signal.

Thus, whenever a message section of the record tape has been played back, all zero's, designating an empty message section, will be recorded in the respective address or storage location of the memory unit MEM.

If selector switch SS is set for Automatic operation, the signal from flip-flop RPF will be automatically applied to line 50, without depressing the Play key, whereupon the energization of the buzzer BUZ will automatically terminate (by a self-contained time-delay of two seconds), and the timer unit TIM will be actuated via gate $G_6$ to effect a 20-second playback and to record all zero's in the storage location of the memory unit MEM corresponding to the tape message section played-back, as described above.

At the end of the 20-second play-back interval, the inhibit signal from flip-flop RPF via line 44 to the ready-bit-search unit RBC will also terminate, thereby reinabling the latter unit to continue its search for another ready-bit in a storage location of the memory unit MEM. If another ready-bit is located, the foregoing Ready-Bit-Search Operation is repeated, and the respective message section is played-back each time a "Ready" bit flag is located in the memory unit MEM until all the messages for the respective point-of-time have been played back.

Should the system have been set for the Manual Mode, and the Play key not have been depressed upon the arrival of a specified point-of-time, no play-back of the message will occur, but the system will continue to flag messages as each subsequent point-of-time arrives, so that when the Play key is eventually depressed, all the messages that were flagged will be played-back at that time. This play-back will be in the order of the flags, and not in the order of the specified points-of-time.

As indicated earlier, a General Scan Operation will be initiated every minute by the timer RTC via gate $G_1$. However, if this operation is initiated during a play-back of a message from the record tape, the signal from the 20-second timer TIM will be applied to the Inhibit terminal of the scan unit SU thereby inhibiting the General Scan Operation during this interval; but as soon as the play-back has been completed, unit SU will be reenabled, thereby permitting the unit to effect a General Scan Operation before the next Ready-Bit Search Operation is initiated.

When a Ready-Bit-Search Operation goes uninterrupted through all 64 storage locations of the memory unit MEM without locating any flag, the ready-bit search unit RBC will output a signal via line 60 to unit ETSS to initiate an Empty Tape Section Search operation.

3. Empty Tape Section Search

During this operation, a search is made through all the memory MEM storage locations, to locate the first one (starting from "zero") which is empty, i.e., having all zero's stored therein. This operation is initiated at any time after the tape has been driven (i.e., either during a play-back or a recording), or when the "In" button has been depressed on the keyboard KB.

Unit ETSS, which initiates the Empty Tape Section Search Operation, will be set at the end of every Ready-Bit Search Operation, via the signal on line 60 from unit REC, as described above; however, if a flag will have been located by the ready-bit decoder RBD, indicating there is a message to be read out from the record tape, unit RBD will apply a signal via OR-gate $G_9$ to unit ETSS resetting same and thereby delaying the Empty Tape Section Search Operation until all the messages have been played back and no ready-bit flags are located, whereupon the Empty Tape Section Search Operation will be automatically initiated by the trailing edge of the set pulse on line 60 form the RBC unit.

During the Empty Tape Section Search Operation, a signal is outputted via line 62 and gate $G_2$ to the oscillator OS which activates same, and also activate the address counter AC which scans all the storage locations in the memory MEM. The signal on output line 62 is also applied, via line 64, to activate the all-zero detector AZD to detect any memory storage location containing all zero's; upon locating one, unit AZD outputs a "hold" signal, via line 66 and gate $G_5$, to hold the address counter AC at the respective memory storage location. The signal outputted from gate $G_5$ is also applied, via line 36, to the arithmetic logic unit ALU which controls the tape drive TD in the manner described above, to cause same to advance the tape to the message section corresponding to the "held" memory storage location. At this time, the ALU also resets the ETSS unit via line 40 and gate $G_9$.

The address counter AC will thus be held at this storage location until the next General Scan Operation is initiated (which occurs every minute by the clock RTC as explained above), unless time data is first inputted from the keyboard KB by depressing the numerical keys NC and the In Key IK. If this occurs, a New Message Input Operation is initiated.

4. New Message Input Operation

This operation is initiated as indicated above, by first depressing the keyboard numerical keys NK to input a future point-of-time, and then depressing the In key IK, at which time a voice message may be recorded to be played back at the inputted future point-of-time.

When the first numerical key is depressed, a signal is outputted on line 10 from the keyboard memory KBM to the display gating unit DG to cause the display unit DISP to display the time inputted from the keyboard, rather than the normally-displayed time outputted from the digital clock RTC. After the point-of-time (date, hour and minute) has been inputted via the keyboard KB, depressing the In button outputs a signal via line 68 to unit ETSS to initiate an Empty Tape Section Search operation.

Normally, the tape will be at a position presenting an empty message section, as described above with respect to the Empty Tape Section Search operation. If a General Scan Operation occurred just before the New Message Input Operation was initiated, causing the address counter to be in its "zero" position, there would be no match between the tape position and the address counter, and therefore the Empty Tape Section Search Operation will be initiated to advance the tape to the first empty message section.

At the end of the Empty Tape Section Search Operation, unit ETSS outputs a pulse via line 62 and gate $G_3$ to the read/write control unit RWC, setting it for a Write operation, whereupon the point-of-time inputted into the keyboard is stored in the respective storage location of the memory unit MEM. As soon as the Write operation has been completed, the keyboard memory KBM will be reset to zero via line 70 and gate $G_8$.

When the user depresses the In key IK on the keyboard KB, after inputting the point-of-time by depressing the numerical keys NK, flip-flop RFF is set to Recording via line 72, and in addition the 20-second timer TIM is activated via line 74 and gate $G_6$. The user may then record the voice message via microphone MC during the 20-second interval provided by the timer TIM, at the end of which time flip-flop RFF is reset via line 54 as described above. During the time interval flip-flop RFF is set in the Recording mode, AND-gate $G_7$ outputs a Signal to gate $G_7$ which prevents the inputting of new information into the memory MEM.

The resetting of the keyboard memory KBM outputs a signal via line 10 to the display gating unit DG which returns the display unit DISP to display the real-time from clock RTC, rather than the time inputted via the keyboard KB.

5. Keyboard-Initiated Message Playback Operation

This operation is initiated whenever it is desired to play-back a previously-recorded message before the arrival of the point-of-time specified for the play-back of that message. To initiate this operation, the relevant point-of-time is inputted by depressing the keyboard numerical keys NK, and then the Out key OK is depressed.

Depressing the Out key OK causes a signal to be applied via gate $G_1$ to the scan unit SU. This will initiate a General Scan Operation as described above, except that in this case the comparator COMP will compare the time data in the memory unit MEM with the time data inputted by depressing the numerical keys NK of the keyboard KB, which latter time data will also be displayed in the display unit DISP as described above.

While the invention has been described with respect to a system using conventional logic circuitry, it will be appreciated that the invention could also be implemented by a micro processor, using known design and programming techniques, enabling the device to be constructed in the form of a single, light-weight, portable hand-held unit.

Many other variations, modifications and applications of the illustrated embodiment of the invention will be apparent.

What is claimed is:

1. An electronic reminder system, comprising: means for receiving a record medium on which a plurality of different spoken messages are each to be recorded and to be played-back at a specified day, hour and minute point-of-time for each message; a microphone for recording the spoken messages; manual time selector means for inputting the specified day, hour and minute point-of-time at which the respective spoken message is to be played-back; a real-time clock for measuring time in a real-time manner and for producing an output corresponding to such real-time measurement; control means controlled by the output of said clock for signaling automatically the arrival of each specified point-of-time at which a recorded spoken message is to be played-back; play-back means including a speaker for effecting the play-back of such spoken messages; and a "Play" key for effecting the play-back of the respective recorded message after its specified point-of-time has arrived.

2. A system according to claim 1, wherein said manual time selector means comprises a keyboard including plurality of depressible keys for inputting the specified point-of-time; an "In" key effective, when depressed, to enable the recording medium to record a spoken message at a section thereof identified by the inputted point-of-time; and an "Out" key effective, when depressed, to enable the record medium to play-back a spoken message from a section thereof identified by the inputted point-of-time.

3. A system according to claim 1, further including a selector switch presettable to an Automatic Mode for automatically signalling the arrival of each specified point-of-time at which a recorded message is to be played back, and for automatically effecting the play back of the respective recorded message upon the arrival of its specified point-of-time; or to a Manual Mode for automatically signalling the arrival of each such specified point-of-time and for enabling the play-back of the respective recorded message; said system further including a manipulatable element which, when manipulated while the selector switch is preset in the Manual Mode, effects the play-back of the respective recorded message after its specified point-of-time has arrived.

4. A system according to claim 1, further including a display unit for displaying the real-time as measured by the clock, said control means including means effective, upon the inputting of a specified point-of-time, to display said latter time instead of the real-time measurement.

5. A system according to claim 1, wherein said record medium includes a message track divided into a plurality of addressable recording sections each for magnetically recording one of said messages.

6. A system according to claim 5, wherein said control means comprises a memory having a stored location for each of said addressable recording sections of the message track; means for storing each inputted point-of-time in the storage location of the memory corresponding to the addressable recording section in which the respective message is to be recorded; comparing means for periodically comparing the output of the real-time clock with the specified point-of-time stored in said memory for determining the arrived of each specified point-of-time at which a recorded message is to be played-back; a signal device actuated by said comparing means for signalling the arrival of a specified point-of-time at which a recorded message is to be played back; and drive means for driving the record medium to the addressable recording section on which is recorded the message corresponding to the arrival specified point-of-time.

7. A system according to claim 6, wherein said comparing means comprises a comparator; means for introducing the output of the real-time clock into the comparator; and a general scan circuit periodically initiated by the clock to effect a general scan operation wherein all said memory locations are scanned and their stored points-of-time contents are sequentially introduced into the comparator for comparison with the real-time clock output; said control means further including a flagging circuit for flagging those memory storage locations which correspond to the real-time clock output.

8. A system according to claim 6, further including an "Out" control member manipulatable by the user for introducing into the comparator an inputted specified point-of-time, rather than the output of the real-time clock, for comparison with the points-of-time stored in the memory storage locations, said flagging circuit being effective to flag those memory storage locations which correspond to the inputted specified point-of time.

9. A system according to claim 7, wherein said control means further includes a flag-search circuit operated at the end of each operation of the general scan circuit for searching the flagged memory storage location; and an arithmetic logic unit effective, when a flagged memory storage location is found, to control the record medium drive means to advance the record medium to the addressable recording section of the message track corresponding to the flagged memory storage location.

10. A system according to claim 9, wherein said general scan circuit comprises an address counter periodically initiated by the real-time clock for scanning all said storage locations of the memory, said flag-search circuit including means for holding the address counter at the address corresponding to a flagged memory storage location until the arithmetic logic unit controls the drive means to advance the record medium to the recording track section corresponding to the flagged memory storage location.

11. A system according to claim 9, wherein said record medium further includes a Mark Track for recording signals marking each of said addressable recording sections of the message track, said control means further including an up-down counter stepped by said mark track signals to thereby produce a continuous indication of the addressable recording section in recording-playback position, said arithmetic logic unit being effective to compare the flagged memory storage location with the address in the up-down counter to control the drive means to advance the record medium to the recording section of the message track corresponding to the flagged memory storage location.

12. A system according to claim 11, wherein said control means further includes a circuit effective, upon the completion of the play-back of all the recorded messages corresponding to a specified point-of-time, to perform an empty-recording-section search wherein an empty storage location of the memory is searched, the address counter is held at the address thereof, and the arithmetic logic unit is enabled to control the drive means to advance the record medium to the recording section corresponding to the address of the empty storage location.

13. A system according to claim 12, further including an "In" Control member which, when manipulated, also initiates said empty-recording-section search.

14. A system according to claim 1, wherein said record medium is a magnetic recording tape.

* * * * *